United States Patent [19]

Bryant

[11] Patent Number: 5,414,491

[45] Date of Patent: May 9, 1995

[54] VACUUM HOLDER FOR SHEET MATERIALS

[75] Inventor: Robert C. Bryant, Honeoye Falls, N.Y.

[73] Assignee: Eastman Kodak Company, Rochester, N.Y.

[21] Appl. No.: 195,408

[22] Filed: Feb. 14, 1994

[51] Int. Cl.⁶ .................. G03B 27/60; G03B 27/62; G03B 27/64; G03B 27/20
[52] U.S. Cl. ........................... 355/73; 355/76; 355/91; 355/94
[58] Field of Search .............. 355/73, 76, 91, 94

[56] References Cited

U.S. PATENT DOCUMENTS

| | | | |
|---|---|---|---|
| 3,584,954 | 6/1971 | Nast | 355/73 |
| 3,610,751 | 10/1971 | Miyauchi | 355/73 |
| 4,175,857 | 11/1979 | Rapp et al. | 355/73 |
| 4,362,380 | 12/1982 | Dragstedt | 355/3 SH |
| 4,378,155 | 3/1983 | Nygaard | 355/73 |
| 4,440,492 | 4/1984 | Howard | 355/76 |
| 4,984,017 | 1/1991 | Nishida et al. | 355/91 |

Primary Examiner—Richard A. Wintercorn
Attorney, Agent, or Firm—Thomas H. Close

[57] ABSTRACT

A sheet material holder includes a vacuum platen defining a plurality of arrays of vacuum channels corresponding in number and size to a plurality of sheet material sizes on one surface thereof and including a corresponding plurality of distinct vacuum plenums communicating with the arrays of vacuum channels; a vacuum pump; a corresponding plurality of remotely actuatable valves connected between the vacuum plenums and the vacuum pump; a corresponding plurality of flow sensors for sensing the flow of air between the plenums and the vacuum pump; and logic and control means connected to the flow sensors and the valves for sensing air flow between a plenum and the vacuum pump and actuating the corresponding valve. Sheet size is automatically inferred by the pattern of valves that are actuated.

3 Claims, 3 Drawing Sheets

VACUUM HOLDER FOR SHEET MATERIALS

FIELD OF INVENTION

The invention relates to a vacuum sheet holder for imaging materials in an input or output scanner.

BACKGROUND OF THE INVENTION

In many common types of imaging equipment which employ cut sheet materials, (such as printers, enlargers, and scanners,) there is a need for constraining the sheet (e.g. plain paper, photographic paper, and film) in a flat or otherwise prescribed manner (e.g. cylindrical) such that it may be optically scanned or conversely have an image registered upon its surface. So-called "vacuum platens" have been a common approach to providing an optically unobstructing and physically non-damaging means of constraining sheet materials in this type of equipment. Typically, a vacuum platen or vacuum stage, consists of a rigid (often flat) surface which is either porous or perforated in order to allow a vacuum to be applied to an opposite surface. Atmospheric pressure thereby loads the sheet material against the platen where a combination of pressure and friction forces constrain the sheet both in-plane and transversely.

It is desirable in such apparatus to accommodate different sizes of sheet material. To keep the size of the vacuum pump to a reasonable size, minimize noise and vibration, and minimize power requirements it is known to provide a plurality of plenums under the supporting surface that vary in size corresponding to the size of the sheet material and to provide a valve that can be manually operated to select the desired plenum. See U.S. Pat. No. 3,584,954. It is also known to provide spring loaded flap valves that automatically shut off plenums that are not covered by the sheet material. See U.S. Pat. No. 4,378,155. The flat springs in the flap valves allow a slight oozing of air while closed, thereby creating a hissing noise and requiring the pump to provide continuous flow to compensate for the vacuum lost by the oozing. In automatic apparatus employing sheet material it is also desirable to automatically sense the size of the sheet material in the apparatus. The sheet material holders shown in the above mentioned patents do not provide this capability.

SUMMARY OF THE INVENTION

Briefly summarized, according to one aspect of the present invention, a sheet material holder includes a vacuum platen defining a plurality of arrays of vacuum channels corresponding in number and size to a plurality of sheet material sizes on one surface thereof and including a corresponding plurality of distinct vacuum plenums communicating with said arrays of vacuum channels; a vacuum pump; a corresponding plurality of remotely actuatable valves connected between the vacuum plenums and the vacuum pump; a corresponding plurality of flow sensors for sensing the flow of air between the plenums and the vacuum pump; and logic and control means connected to the flow sensors and the valves for sensing air flow between a plenum and the vacuum pump and actuating the corresponding valve. In a preferred embodiment, the logic and control means automatically provides a signal representing sheet material size based on the valves that were actuated.

The invention has the advantage of providing a complete shutoff thereby avoiding any slight oozing of air to plenums that are not covered by the sheet material. The invention has the further advantage of providing an automatic signal representing the size of the sheet material present.

These and other aspects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
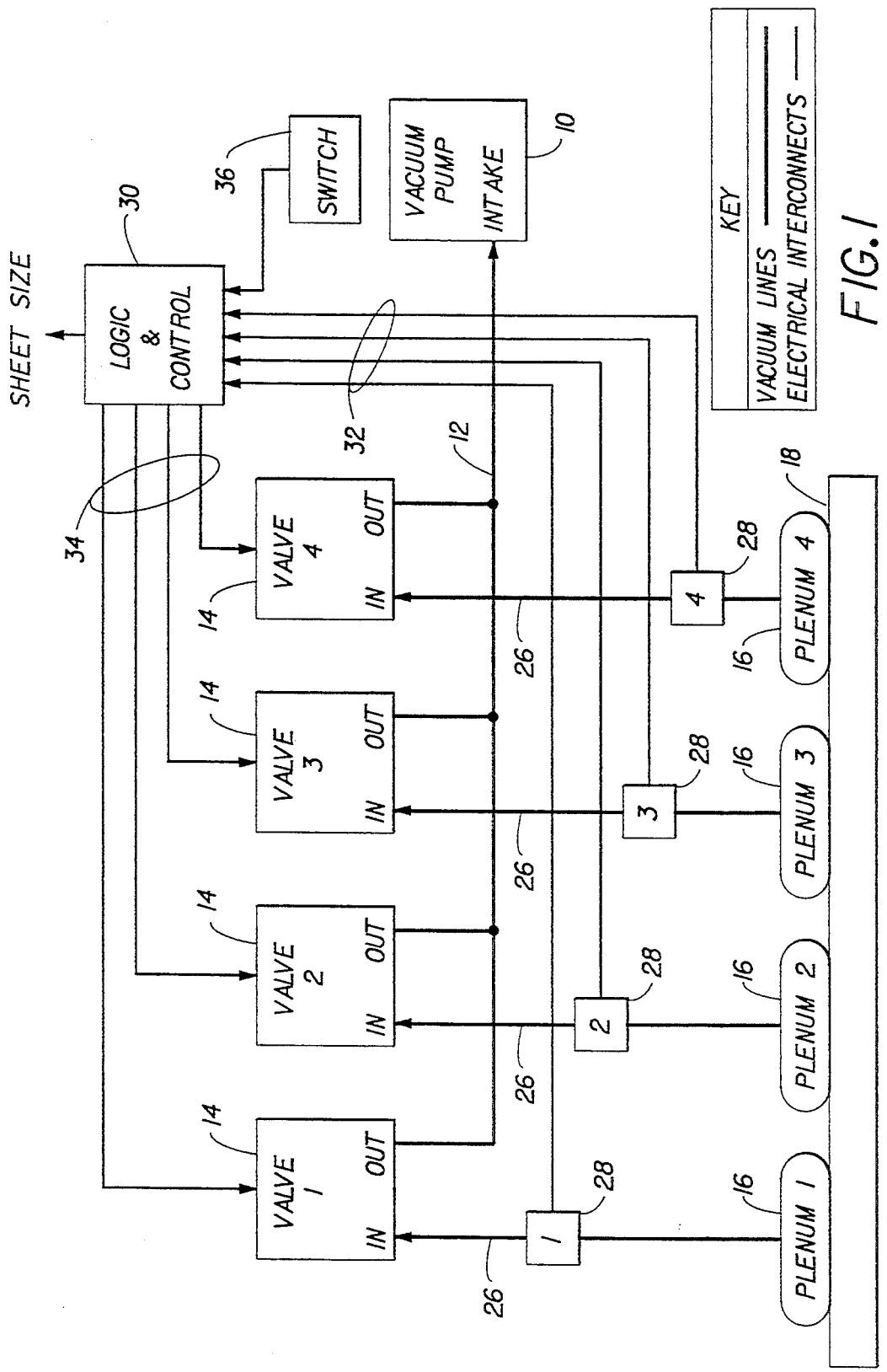
FIG. 1 is a schematic diagram showing a sheet material holder according to the present invention.

The system's components and their interconnections are illustrated in FIG. 1 which depicts a four format material holder according to the present invention. A continuously-running vacuum pump 10 generates a sub atmospheric pressure. This pump can be characterized as a low flow rate/high differential pressure device in that it is designed to maintain high vacuum at low flow rates. The low pressure side of this pump is connected by a manifold 12 in parallel to a plurality of valves 14 which are used to control the flow to a plurality of plenums 16. The plenums 16 are couple to the back of a vacuum platen 18.

Figure 2:
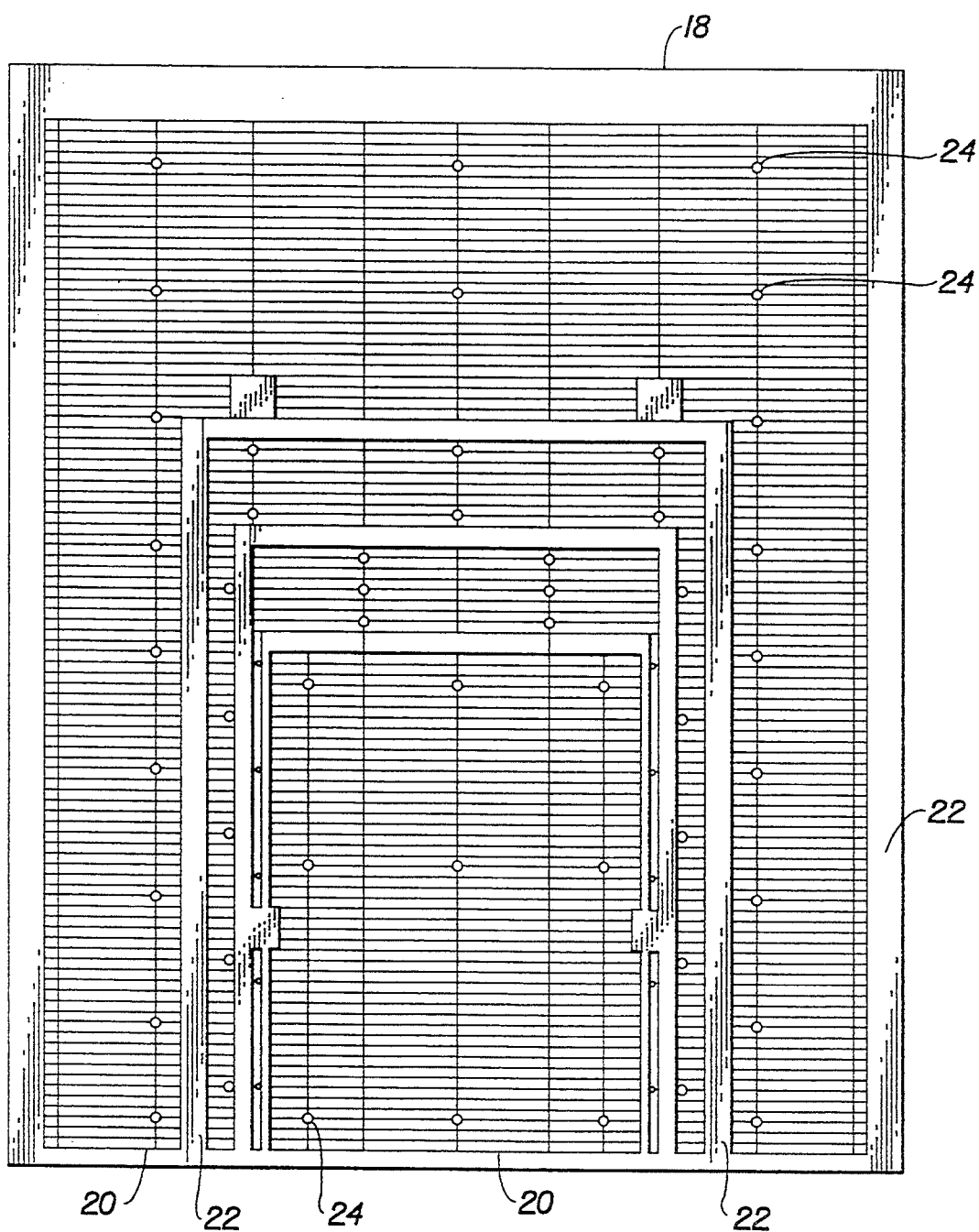
FIG. 2 is top view of the vacuum platen of the sheet material holder.

A top view of the vacuum platen 18 is shown in FIG. 2. The top surface of the vacuum platen 18 defines physically separate areas of grooves 20 and lands 22. The patterns of grooves 20 surrounded by the lands 22 correspond to the anticipated sheet formats. Four such formats being shown in FIG. 2. A number of holes 24 are provided in the grooves to communicate the vacuum from the plenums on the back side of the platen (not shown in FIG. 2.) These features are provided to meter, distribute, and communicate the vacuum flow over limited regions of the vacuum platen's surface.

Returning to FIG. 1, each of the plenums 16 is individually connected by line 26 to a flow valve 14 corresponding to that plenum. Additionally, each line 26 connecting a plenum to a valve 14 is equipped with an individual flow sensor 28 whose electrical output is fed back to a logic and control unit 30. The logic and control unit 30, which may comprise for example a standard micro controller, receives the signal from the sensors 28 on wires 32 and controls the operation of the valves 14 via wires 34. In the preferred embodiment, a foot switch 36 is provided to allow an operator to temporarily interrupt the vacuum supply by closing valves 14 to all the plenums 16 simultaneously in order to manually position a sheet upon the vacuum platen 18, thereby freeing both hands for this operation.

Figure 3:
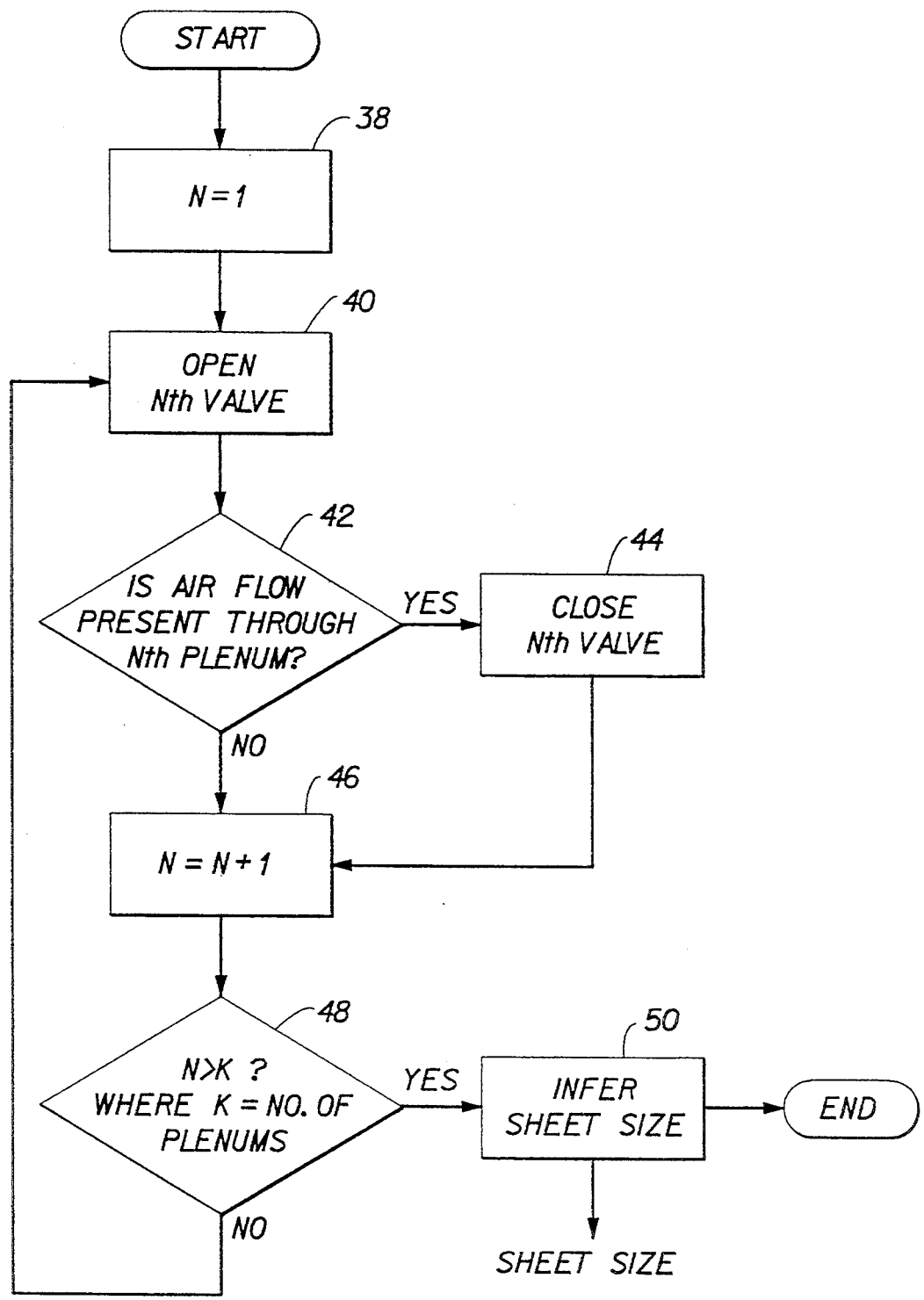
FIG. 3 is a flow chart of the operation of the sheet material holder according to the present invention.

Once the foot switch 36 has been released, the logic and control unit 30 begins the sequential interrogation of the flow sensors 28 according to the flowchart as shown in FIG. 3. A counter N is first set to 1 (38). Next, the $N^{th}$ control valve 14 is opened (40) and the presence of air flow through the $N^{th}$ plenum 16 is sensed by interrogating the output (42) of the $N^{th}$ sensor 28. If air flow is sensed, the logic and control 30 signals the $N^{th}$ valve to close (44). If no airflow is sensed, the counter is incremented by one (46), and a check is made to determine whether all of the flow sensors have been interrogated (48). If less than all of the sensors have been interrogated, the next valve is opened and the cycle repeated. When all the valves have been interrogated, the pattern of valves remaining open (or closed) is used to infer (50) the format of the sheet material on the vacuum platen 18, and a sheet size signal is generated by the logic and control unit.

The sheet size signal may be supplied for example to a host controller (not shown) to effect some system parameter. For example, the sheet size information can be used to control magnification settings or document transport parameters in a color reflection print scanner for the Kodak Photo CD system.

The duration of sensing for each sequential plenum 16 is chosen to be long enough for a steady state flow to be established in that plenum. This time is a function of both the pump capacity and flow restrictions throughout the vacuum distribution system.

Upon completing the cycle as described above, the system maintains the vacuum to the selected plenums and thereby holds the sheet in place until the foot switch 36 is depressed or the logic and control unit 30 receives an initialization command from an external source (not shown).

While the invention has been described with particular reference to a preferred embodiment, it will be understood by those skilled in the art that various changes may be made and equivalents may be substituted for elements of the preferred embodiment without departing from invention.

PARTS LIST 10 vacuum pump
12 manifold
14 valves
16 plenums
18 vacuum platen
20 grooves
22 lands
24 holes
26 line
28 flow sensor
30 logic & control unit
wires
wires
36 switch

What is claimed is:

1. A sheet material holder, comprising;
   a. a vacuum platen defining a plurality of arrays of vacuum channels corresponding in number and size to a plurality of sheet material sizes on one surface thereof and including a corresponding plurality of distinct vacuum plenums communicating with said arrays of vacuum channels;
   b. a vacuum pump;
   c. a corresponding plurality of remotely actuatable valves connected between the vacuum plenums and the vacuum pump;
   d. a corresponding plurality of flow sensors for sensing the flow of air between the plenums and the vacuum pump; and
   e. logic and control means connected to the flow sensors and the valves for sensing air flow between a plenum and the vacuum pump and actuating the corresponding valve.

2. The sheet material holder claimed in claim 1, wherein said logic and control means provides a signal representing sheet material size based on the valves that were actuated.

3. The sheet material holder claimed in claim 1, further comprising a switch connected to the logic and control means for causing the logic and control means to close all of the valves so that sheet material may be removed from the sheet material holder.

* * * * *